United States Patent
Dai et al.

(10) Patent No.: US 7,524,570 B2
(45) Date of Patent: Apr. 28, 2009

(54) PERPENDICULAR MAGNETIC RECORDING SYSTEM AND MEDIUM WITH HIGH-MOMENT CORROSION-RESISTANT "SOFT" UNDERLAYER (SUL)

(75) Inventors: Qing Dai, San Jose, CA (US); Bernd Heinz, San Jose, CA (US); Yoshihiro Ikeda, San Jose, CA (US); Mary Frances Minardi, Santa Cruz, CA (US); Kentaro Takano, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 575 days.

(21) Appl. No.: 11/251,142

(22) Filed: Oct. 13, 2005

(65) Prior Publication Data
US 2007/0087225 A1    Apr. 19, 2007

(51) Int. Cl.
G11B 5/667    (2006.01)
(52) U.S. Cl. .................. 428/827; 428/829; 360/135
(58) Field of Classification Search .............. None
See application file for complete search history.

(56) References Cited

U.S. PATENT DOCUMENTS

| | | | |
|---|---|---|---|
| 4,842,657 A * | 6/1989 | Masumoto et al. | 148/403 |
| 6,686,070 B1 | 2/2004 | Futamoto et al. | |
| 6,787,252 B2 | 9/2004 | Sakai et al. | |
| 6,835,475 B2 | 12/2004 | Carey et al. | |
| 7,201,977 B2 * | 4/2007 | Li et al. | 428/829 |
| 2003/0022023 A1 * | 1/2003 | Carey et al. | 428/694 MM |
| 2004/0045809 A1 | 3/2004 | Rou et al. | |
| 2004/0247940 A1 | 12/2004 | Chang et al. | |
| 2004/0247945 A1 | 12/2004 | Chen et al. | |
| 2005/0074633 A1 | 4/2005 | Lee et al. | |
| 2005/0098426 A1 | 5/2005 | Ranjan et al. | |
| 2005/0100664 A1 | 5/2005 | Chang et al. | |
| 2005/0100764 A1 | 5/2005 | Ranjan et al. | |
| 2005/0178651 A1 | 8/2005 | Ranjan et al. | |
| 2005/0181239 A1 | 8/2005 | Ma et al. | |
| 2005/0202286 A1 | 9/2005 | Chen et al. | |
| 2005/0214585 A1 | 9/2005 | Li et al. | |

OTHER PUBLICATIONS

EPO Search Report for App. 06254303.8-1217 corresponding to U.S. Appl. No. 11/251,142.
Uwazumi, et al., "CoPtCr-SiO2 Granular Media for High-Density Perpendicular Recording", IEEE Transactions on Magnetics, vol. 39, No. 4, Jul. 2003, pp. 1914-1918.
Chiba et al., "Structure and magnetic properties of Co-Pt-Ta2O5 film for perpendicular magnetic recording media", J. of Mag and Magn Mater, vol. 287, Feb. 2005, pp. 161-171.

* cited by examiner

Primary Examiner—Kevin M Bernatz
(74) Attorney, Agent, or Firm—Thomas R. Berthold

(57) ABSTRACT

A perpendicular magnetic recording disk has a soft magnetic underlayer (SUL) that has high corrosion resistance as well as high moment. The material of the SUL is an alloy comprising Co, Fe, X, and Y; where X is Ta or Nb, Y is Zr or Hf, and the combined amount of X and Y present in the alloy is between about 10 and 20 atomic percent. The atomic ratio of Co to Fe in the alloy is between about 90:10 to 10:90, preferably between about 25:75 and 35:65. The SUL may be a single-layer SUL or a multilayer SUL formed of multiple soft magnetic layers separated by an interlayer film or films.

17 Claims, 4 Drawing Sheets

PERPENDICULAR MAGNETIC RECORDING SYSTEM AND MEDIUM WITH HIGH-MOMENT CORROSION-RESISTANT "SOFT" UNDERLAYER (SUL)

BACKGROUND OF THE INVENTION

1. Field of the Invention

This invention relates generally to perpendicular magnetic recording media, and more particularly to a "dual-layer" perpendicular magnetic recording disk with a recording layer (RL) formed on a "soft" or relatively low-coercivity magnetically permeable underlayer (SUL).

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. A common type of perpendicular magnetic recording system is one that uses a "dual-layer" media. This type of system is shown in FIG. 1 with a single write pole type of recording head. The dual-layer media includes a perpendicular magnetic data recording layer (RL) formed on a "soft" or relatively low-coercivity magnetically permeable underlayer (SUL). The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field $H_W$ acting on the recording layer RL. The disk also includes the hard disk substrate, an adhesion or onset layer (OL) for growth of the SUL, a nonmagnetic exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the EBL and by virtue of its high permeability produces a magnetic mirror image of the RWH during the write process. This effectively brings the RL into the gap of the ARH and allows for a large write field $H_W$ inside the RL.

One type of material for the RL is a granular ferromagnetic cobalt alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce inter-granular exchange coupling, which is responsible for high intrinsic media noise. Thus, the RL may include oxides, such as oxides of Si, Ta and Nb, which precipitate to the grain boundaries to enhance the grain segregation in the cobalt alloy RL. A perpendicular magnetic recording medium with a RL of a CoPtCr granular alloy with added $SiO_2$ is described by H. Uwazumi, et al., "CoPtCr—$SiO_2$ Granular Media for High-Density Perpendicular Recording", IEEE Transactions on Magnetics, Vol. 39, No. 4, July 2003, pp. 1914-1918. A perpendicular magnetic recording medium with a RL of a CoPt granular alloy with added $Ta_2O_5$ is described by T. Chiba et al., "Structure and magnetic properties of Co—Pt—$Ta_2O_5$ film for perpendicular magnetic recording media", Journal of Magnetism and Magnetic Materials, Vol. 287, February 2005, pp. 167-171.

The SUL is typically comprised of a high moment ($M_s$) material with a total thickness in the range of about 50 nm to 400 μm. The $M_s$ and thickness of the SUL must be sufficient to avoid SUL saturation, which will deteriorate the writing performance. The critical thickness t(SUL) should satisfy the following equation:

$$t(SUL)=M_s(\text{Write Head})/2M_s(SUL) \times LW/(L+W),$$

where L and W are the length and width of the write pole, respectively. To achieve higher recording densities on the disk, the write pole will be made smaller, which will allow the thickness of the SUL to decrease. A high $M_s$ for the SUL is required to prevent a degradation of the write field and the write-field gradient, which would decrease recording performance. However, a higher $M_s$ for the SUL material will also reduce the SUL thickness requirement. Because the SUL is typically formed of amorphous magnetically permeable materials that include Co, Fe, and/or Ni, which are very reactive and easily form oxides and nitrides when exposed to air or water, the SUL is highly susceptible to corrosion. Thus, it is important that the SUL not only have a high $M_s$, but also be resistant to corrosion, especially for thinner SULs.

CoTaZr and CoNbZr alloys are known materials for use as the SUL. However, these high-moment alloys have poor corrosion resistance.

What is needed is a perpendicular magnetic recording medium with a SUL that achieves good corrosion resistance and high $M_s$, so that the recording properties of the medium are not degraded.

SUMMARY OF THE INVENTION

The invention is a perpendicular magnetic recording disk with a SUL layer or layers that have high corrosion resistance as well as high moment, and a perpendicular magnetic recording system that includes the disk. The material of the SUL is an alloy comprising Co, Fe, X, and Y; where X is Ta or Nb, Y is Zr or Hf, and the combined amount of X and Y present in the alloy is between about 10 and 20 atomic percent. The atomic ratio of Co to Fe in the alloy is between about 90:10 to 10:90, preferably between about 25:75 and 35:65. The SUL may be a single-layer SUL or a multilayer SUL formed of multiple soft magnetic layers separated by an interlayer film or films.

For a fuller understanding of the nature and advantages of the present invention, reference should be made to the following detailed description taken together with the accompanying figures.

DETAILED DESCRIPTION OF THE INVENTION

Figure 1:
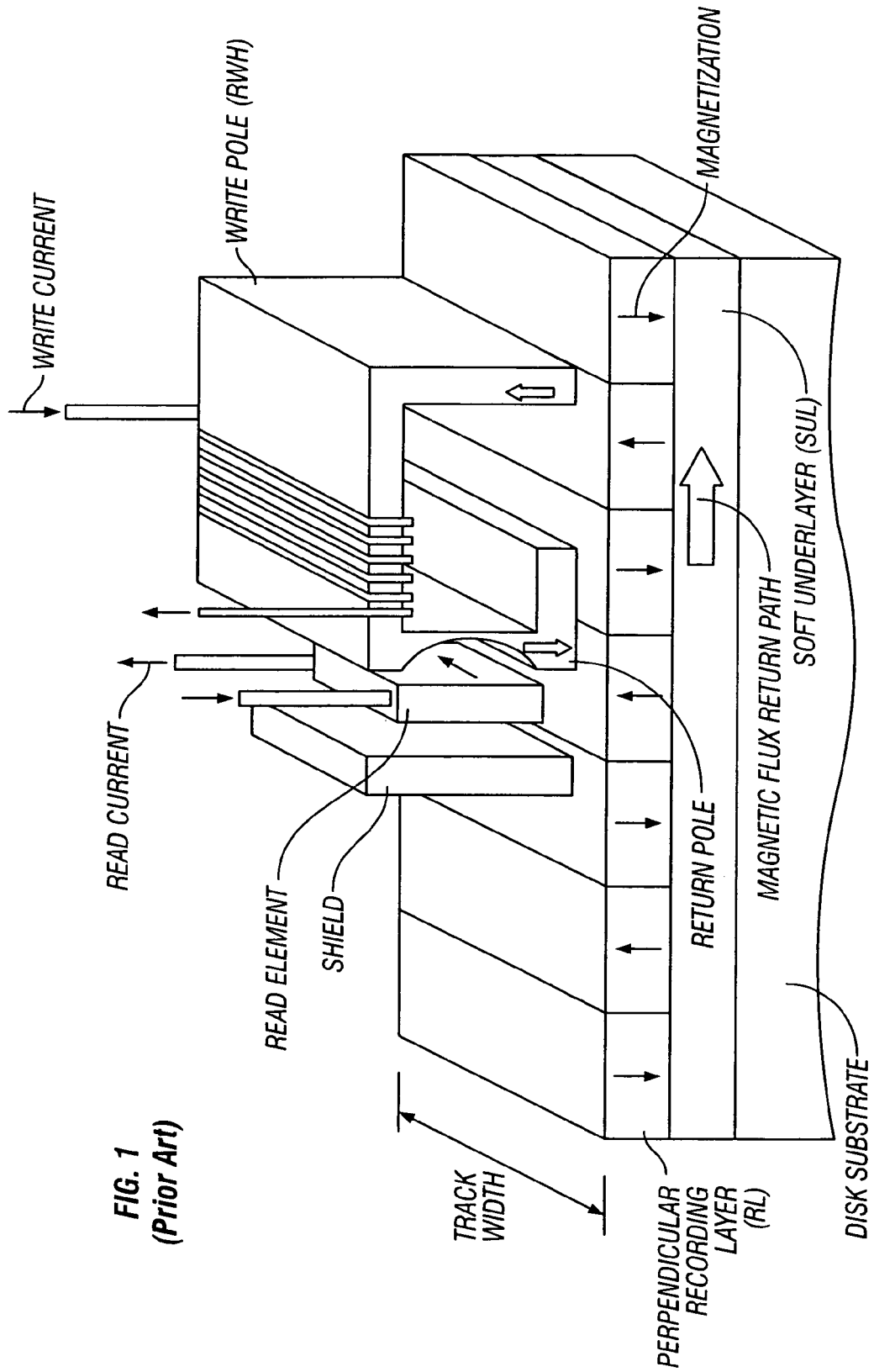
FIG. 1 is a schematic of a perpendicular magnetic recording system.
Figure 2:
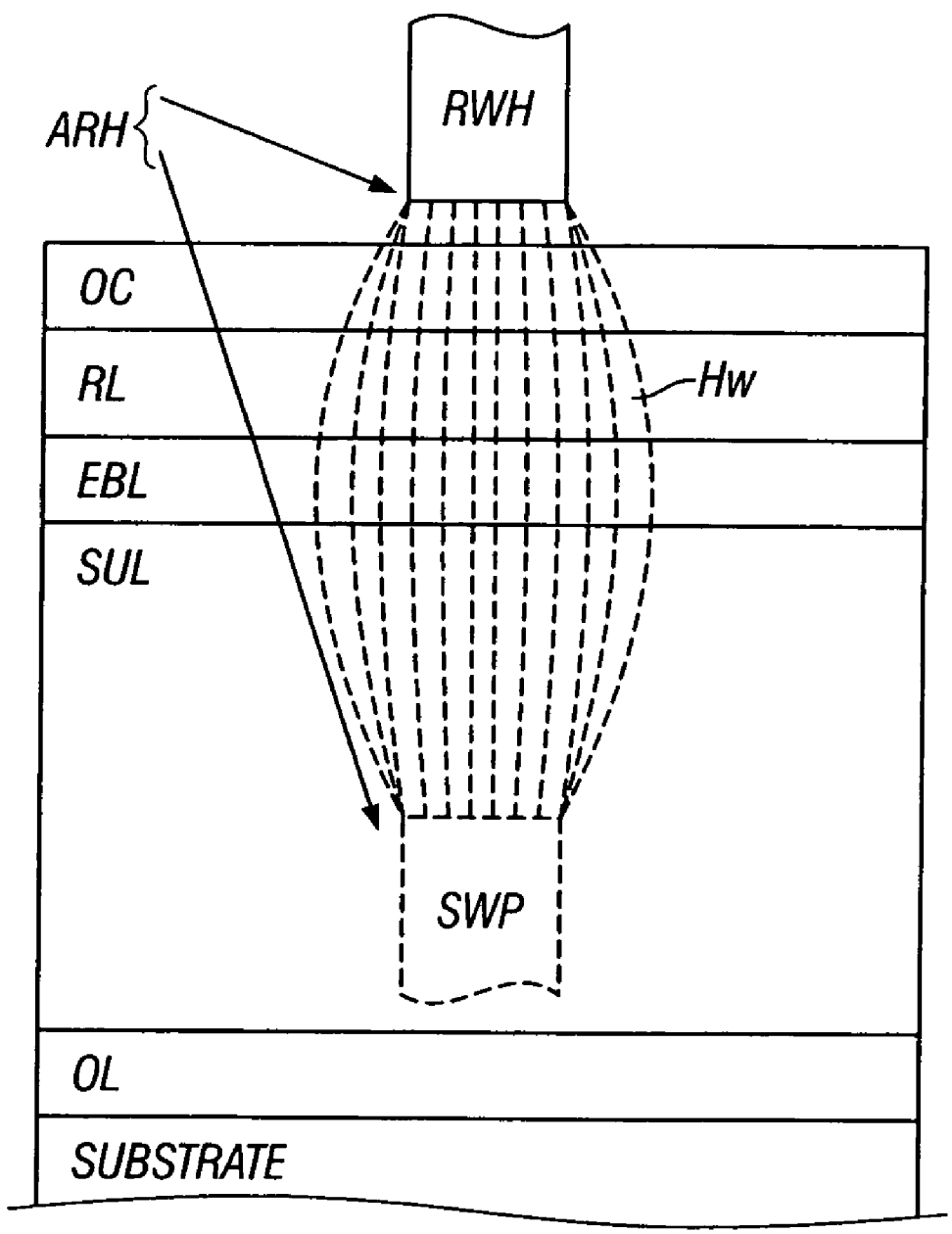
FIG. 2 is a schematic of a cross-section of a perpendicular magnetic recording disk depicting the write field.
Figure 3:
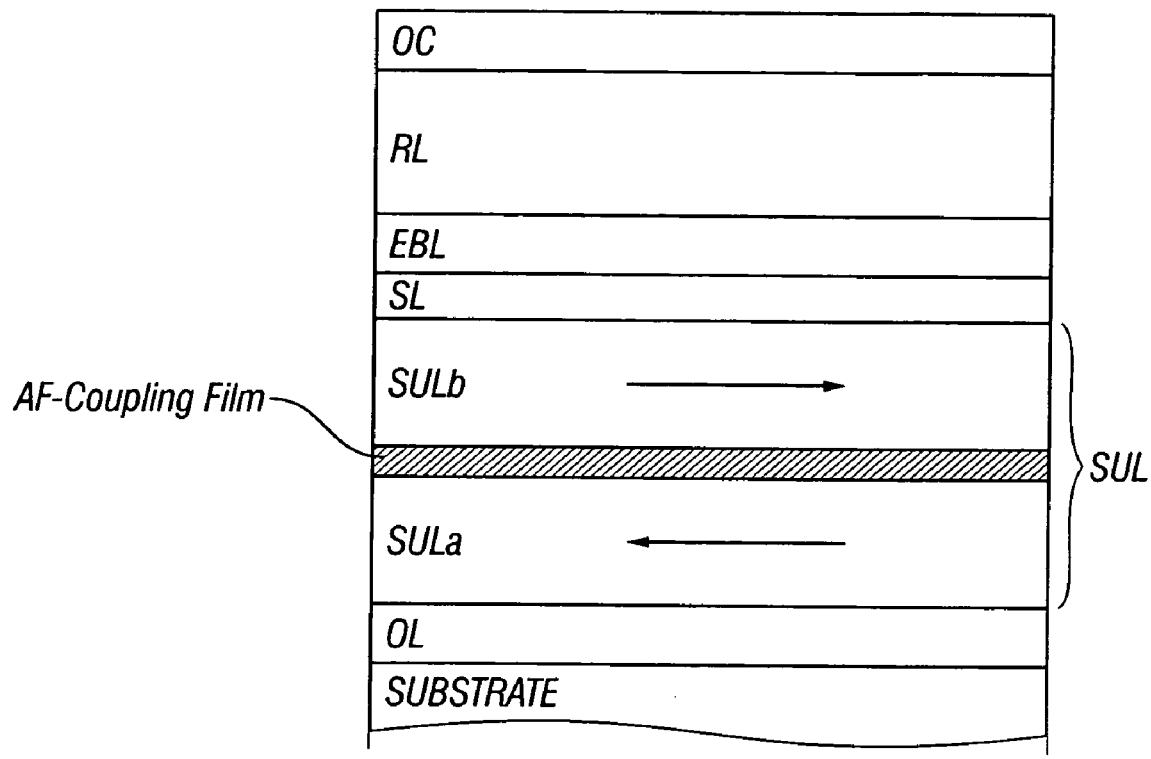
FIG. 3 is a schematic of a cross-section of a perpendicular magnetic recording disk with an antiferromagnetically-coupled laminated SUL.

A perpendicular magnetic recording disk as known in the prior art is illustrated in FIG. 3. The various layers making up the disk are located on the hard disk substrate. The substrate may be any commercially available glass substrate, but may also be a conventional aluminum alloy with a NiP or other known surface coating, or an alternative substrate, such as silicon, canasite or silicon-carbide. The SUL is located on the substrate, either directly on the substrate or directly on an adhesion layer or onset layer (OL). The OL facilitates the growth of the SUL and may be an AlTi alloy or a similar material with a thickness of about 2-5 nanometers (nm).

The SUL may be a single layer of soft magnetically permeable material. It is desirable that the SUL behave magnetically soft, and be devoid of domain walls. Magnetic "softness", in this instance, refers to the ability of the SUL to carry magnetic flux directly in proportion to the in-plane magnetic fields driving that flux. To achieve magnetic softness without domain walls, it is desired that in the quiescent state, i.e., absent of recorded transitions and/or writing fields, the SUL be effectively in a "single-domain-state", whereby the magnetization in the SUL is everywhere aligned in predominantly a single direction. The presence of multiple domains in the SUL is a source of media noise and could lead to localized regions of enhanced thermal demagnetization of the recorded information in the recording layer. To address these issues, laminated multilayered SULs have been proposed. The SUL depicted in FIG. 3 is a laminated or multilayered SUL formed of multiple soft magnetic layers (SULa and SULb) separated by an interlayer film (such as Ru, Ir, or Cr) that acts as an antiferromagnetic (AF) coupling film to mediate antiferromagnetic exchange coupling between SULa and SULb. The arrows in SULa and SULb in FIG. 3 represent the antiparallel magnetization directions in the quiescent state. This type of SUL is described in U.S. Pat. Nos. 6,686,070 B1 and 6,835,475 B2. The SUL may also be a laminated or multilayered SUL formed of multiple soft magnetic films separated by nonmagnetic films, such as films of carbon or SiN or electrically conductive films of Al or CoCr. The single-layer SUL and the individual soft magnetic layers in a laminated SUL are typically formed of amorphous magnetically permeable alloys that include Co, Fe, and/or Ni, such as CoTaZr and CoNbZr. The thickness of the SUL is typically in the range of approximately 50-400 nm. In the near future, the SUL will drop below 50 nm in thickness as the write pole dimensions continue to scale smaller with each product generation.

The nonmagnetic EBL on the SUL is a nonmagnetic metal or alloy having a hexagonal close-packed (hcp) crystal structure for controlling the hcp crystal orientation in the granular RL. The EBL promotes the growth of the hcp granular RL so that its c-axis is oriented substantially perpendicular, thereby resulting in perpendicular magnetic anisotropy. Ruthenium (Ru) is a commonly used material for the EBL, but other materials include a metal selected from Ti, Re, and Os, and an alloy containing at least one element selected from Ti, Re, Ru, and Os, including Ru-based alloys. If Ru is used as the EBL, it may be formed directly on a seed layer (SL) that is formed on the SUL.

The RL is a granular ferromagnetic Co alloy with inter-granular material made up of one or more oxides of one or more added segregants. Preferably the oxide or oxides in the inter-granular material is an oxide or oxides of just one element, i.e., either Si—Ox, Ti—Ox, or Ta—Ox. The RL may also contain Cr, with one or more oxides of Cr also being present as inter-granular material. Thus typical RL compositions would include CoPtCr—$SiO_2$, CoPtCr—$TiO_2$, and CoPt—$Ta_2O_5$.

The OC formed on the RL may be an amorphous "diamond-like" carbon film or other known protective overcoat, such as silicon nitride.

The common compositions of CoTaZr and CoNbZr alloys for use as the SUL are highly susceptible to corrosion. This has been demonstrated by examination of a perpendicular magnetic recording disk with an SUL formed of $Co_{92}Ta_3Zr_5$ (where the subscripts represent atomic percent) using optical microscopy and transmission electron microscopy (TEM). Examination of the SUL at 500× with a Zeiss optical microscope showed that cobalt oxalate rods are distributed uniformly around a film defect that has exposed the underlying SUL. In perpendicular magnetic recording disks, Co oxalate ($CoC_2O_4$) is the corrosion product that is often present in the form of rods or needles. They are typically about 1-2 μm long and about 0.1 μm or in diameter. Due to lack of passivation of the SUL and the high mobility of Co ions, especially in the presence of galvanic coupling due to more noble materials such as the carbon overcoat, the Co ions stream upward and react with oxalic acid in ambient environment to form rod-shaped Co oxalate. Additionally, a cross-sectional TEM clearly showed the oxidation of the underlying SUL layers from the defect center. These results indicate that the Ta and Zr content of the $Co_{92}Ta_3Zr_5$ alloy is not sufficient to passivate the corrosion.

The amount of Ta and Zr in a CoTaZr SUL was increased to determine if passivation of corrosion could be attained. Corrosion testing indicated that a $Co_{85}Ta_{10}Zr_5$ SUL has sufficient corrosion resistance. However, while the $Co_{85}Ta_{10}Zr_5$ alloy had sufficient corrosion resistance, its $M_s$ was approximately 25% less than the $M_s$ of the $Co_{92}Ta_3Zr_5$ alloy. A reduction of $M_s$ can lead to a loss in the recording performance due to a degradation of the write field and the write-field gradient.

The invention is a perpendicular magnetic recording disk with a SUL layer or layers that have high corrosion resistance as well as high moment. The material of the SUL is an alloy comprising Co, Fe, X, and Y; where X is Ta or Nb, Y is Zr or Hf, and the combined amount of X and Y present in the alloy is between about 10 and 20 atomic percent. The atomic ratio of Co to Fe in the alloy is between about 90:10 to 10:90, preferably between about 25:75 and 35:65.

Figure 4:
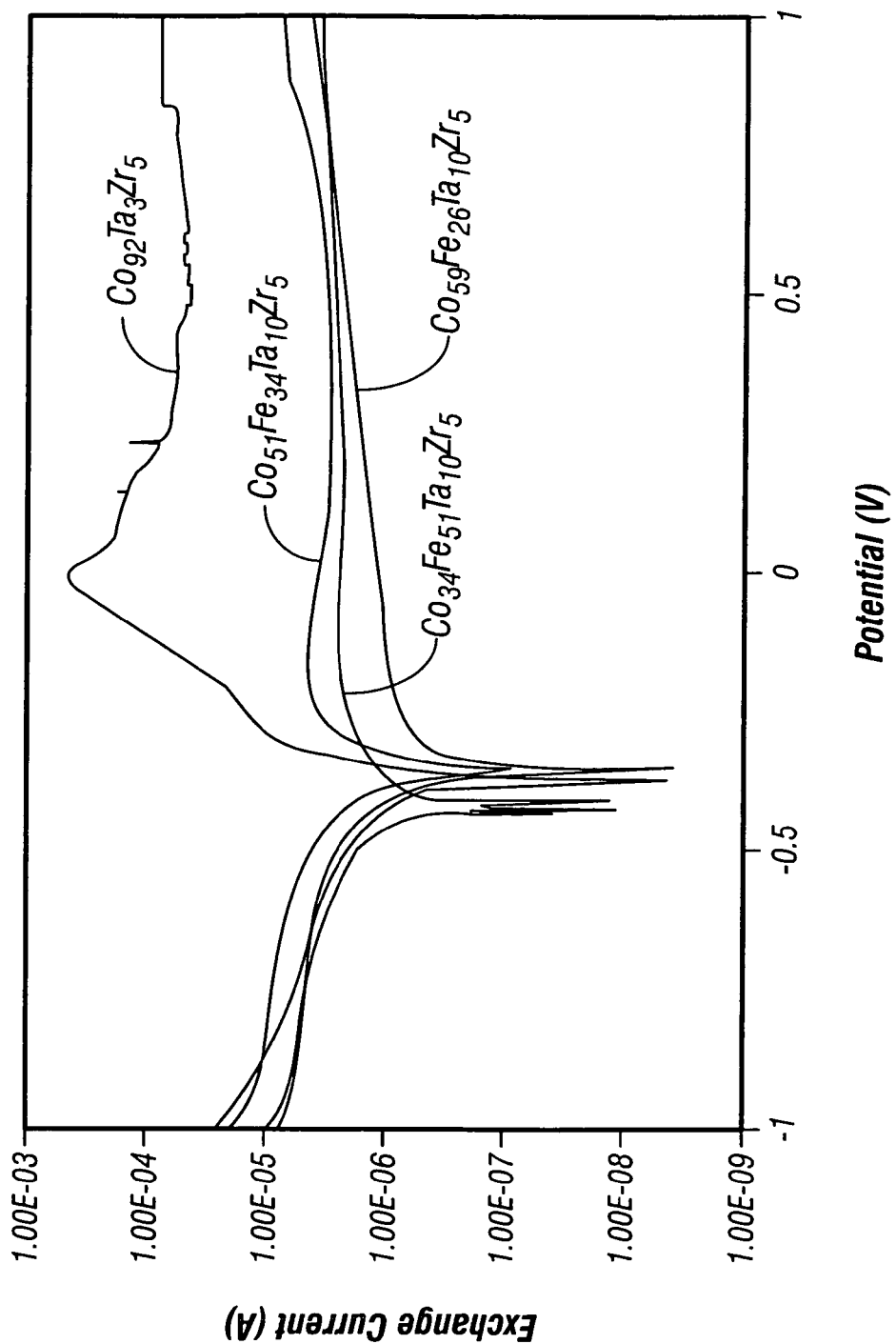
FIG. 4 is a set of electrochemical polarization curves for different CoFeTaZr alloys and for a $Co_{92}Ta_3Zr_5$ alloy.

SULs with different compositions of a CoFeTaZr alloy were tested for both corrosion resistance and moment. FIG. 4 is a comparison of electrochemical polarization curves for different CoFeTaZr alloys and a $Co_{92}Ta_3Zr_5$ alloy. The data for these curves was obtained in an experimental setup in which the SUL is formed on a glass substrate with the SUL serving as one electrode. A platinum (Pt) electrode was then placed 1 mm above the SUL and a drop of water was deposited between the Pt electrode and the SUL. The applied voltage was then scanned from −1.0 V to +1.0 V and the current measured as a function of applied voltage. In FIG. 4, the negative spikes at about −0.4 V indicate the transition from the cathodic region to the anodic region where the SUL becomes the anode. As the voltage is increased positively, electrons are drawn out of the SUL. The value of the measured current in the anodic region is an indication of the likelihood of corrosion of the SUL. As shown in FIG. 4, the highest exchange current is for the $Co_{92}Ta_3Zr_5$ alloy. The polarization curve for the $Co_{92}Ta_3Zr_5$ alloy rises rapidly and only begins to decrease because the alloy has corroded so heavily that the test electrodes have been severely eroded. The other three alloys ($Co_{34}Fe_{51}Ta_{10}Zr_5$, $Co_{51}Fe_{34}Ta_{10}Zr_5$, and $Co_{59}Fe_{26}Ta_{10}Zr_5$) all showed substantially lower levels of exchange current. At zero electrical potential, the exchange current for the $Co_{92}Ta_3Zr_5$ alloy was about $50\times10^{-6}$ A, compared to about $2\times10^{-6}$ A, $3\times10^{-6}$ A, and $1\times10^{-6}$ A, respectively, for the $Co_{34}Fe_{51}Ta_{10}Zr_5$, $Co_{51}Fe_{34}Ta_{10}Zr_5$, and $Co_{59}Fe_{26}Ta_{10}Zr_5$ alloys. Thus the alloys of this invention are between about 15 to 50 times more resistant to corrosion.

To test the susceptibility of the films to corrosion, a control film of $Co_{92}Ta_3Zr_5$ and films made using the various (CoFe)$Ta_{10}Zr_5$ SUL alloys were subjected to a severe condensation test consisting of exposure to elevated temperature (65° C.) at high humidity (99%) for four days. The control film ($Co_{92}Ta_3Zr_5$) was decorated with corrosion spots indicating defects with Co oxalate rods. However the (CoFe)$Ta_{10}Zr_5$ films did not show any corrosion spots. This result verifies the measured electrochemical polarization curves and improved corrosion resistance for the SUL alloys of this invention.

The $M_s$ of two (CoFe)$Ta_{10}Zr_5$ SUL alloys were measured at 11 kOe and 12 kOe, respectively, which is only slightly less than the 13 kOe for the of the $Co_{92}Ta_3Zr_5$ control alloy. The atomic ratio of Co to Fe in the new SUL alloys is between about 90:10 to 10:90 to achieve the desired $M_s$. The $M_s$ can be further improved by optimizing the Co:Fe atomic ratio to near 30:70 (between about 25:75 and 35:65) which generates the maximum $M_s$ according to the well-known Slater-Pauling curve. In addition, if the corrosion tests indicate that corrosion resistance of the (CoFe)$Ta_{10}Zr_5$ SUL alloys exceed the product specification, the $M_s$ can be further optimized by reducing the Ta and/or Zr content. The combined amount of Ta and Zr in the alloy is preferably between about 10 and 20 atomic percent.

While the CoFeXY SUL alloy of this invention has been demonstrated, as described above, with Ta and Zr, Nb can be substituted for Ta and/or Hf can be substituted for Zr.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate;
   a perpendicular magnetic recording layer; and
   an underlayer comprising magnetically permeable material between the substrate and the recording layer, the magnetically permeable material being an alloy consisting essentially only of Co, Fe, Ta and Zr wherein the combined amount of Ta and Zr in said CoFeTaZr alloy is greater than or equal to 10 atomic percent and less than or equal to 20 atomic percent and the moment ($M_s$) is greater than or equal to 11 kOe, and wherein said CoFeTaZr alloy exhibits a corrosion current at zero electrical potential in an electrochemical corrosion test and a $Co_{92}Ta_3Zr_5$ alloy exhibits a corrosion current at zero electrical potential in said test that is at least 15 times the corrosion current of said CoFeTaZr alloy.

2. The medium of claim 1 wherein the amount of Ta in said alloy is 10 atomic percent and the amount of Zr in said alloy is 5 atomic percent.

3. The medium of claim 1 wherein the atomic ratio of Co in said alloy to Fe in said alloy is in the range of about 90:10 to 10:90.

4. The medium of claim 3 wherein the atomic ratio of Co in said alloy to Fe in said alloy is in the range of about 25:75 to 35:65.

5. The medium of claim 1 further comprising an exchange-break layer between the underlayer and the recording layer for magnetically decoupling the recording layer and the underlayer.

6. The medium of claim 1 wherein the recording layer comprises a granular ferromagnetic Co alloy.

7. The medium of claim 6 wherein the recording layer comprises an oxide or oxides of one or more of an element selected from the group consisting of Si, Ta, Ti, and Nb.

8. The medium of claim 1 wherein the underlayer comprises two films of said magnetically permeable material separated by a nonmagnetic film.

9. The medium of claim 8 wherein the nonmagnetic film provides antiferromagnetic coupling of the two magnetically permeable films.

10. A perpendicular magnetic recording system comprising:
    the medium of claim 1;
    a write head for magnetizing regions in the recording layer of said medium; and
    a read head for detecting the transitions between said magnetized regions.

11. A perpendicular magnetic recording disk comprising:
    a substrate;
    a magnetically permeable underlayer on the substrate and comprising an alloy consisting essentially only of Co, Fe, Ta and Zr, wherein the combined amount of Ta and Zr in said CoFeTaZr alloy is greater than or equal to 10 atomic percent and less than or equal to 20 atomic percent and the moment ($M_s$) is greater than or equal to 11 kOe, and wherein said CoFeTaZr alloy exhibits a corrosion current at zero electrical potential in an electrochemical corrosion test and a $Co_{92}Ta_3Zr_5$ alloy exhibits a corrosion current at zero electrical potential in said test that is at least 15 times the corrosion current of said CoFeTaZr alloy;
    a perpendicular magnetic recording layer comprising grains of a Co-based ferromagnetic alloy having a hexagonal-close-packed (hcp) crystalline structure with the c-axis oriented substantially perpendicular to the recording layer; and
    an exchange-break layer between the underlayer and the recording layer for magnetically decoupling the recording layer and the underlayer.

12. The disk of claim 11 wherein the amount of Ta in said alloy is 10 atomic percent and the amount of Zr in said alloy is 5 atomic percent.

13. The disk of claim 11 wherein the atomic ratio of Co in said alloy to Fe in said alloy is in the range of about 90:10 to 10:90.

14. The disk of claim 13 wherein the atomic ratio of Co in said alloy to Fe in said alloy is in the range of about 25:75 to 35:65.

15. The disk of claim 11 wherein the recording layer further comprises an oxide or oxides of one or more of an element selected from the group consisting of Si, Ta, and Nb.

16. The disk of claim 11 wherein the underlayer comprises two films of said magnetically permeable material and further comprising a nonmagnetic film separating said two magnetically permeable films.

17. The disk of claim 16 wherein the nonmagnetic film provides antiferromagnetic coupling of the two magnetically permeable films.

* * * * *